B. J. DRYER.
RESILIENT WHEEL.
APPLICATION FILED FEB. 11, 1914.
1,142,504.
Patented June 8, 1915.
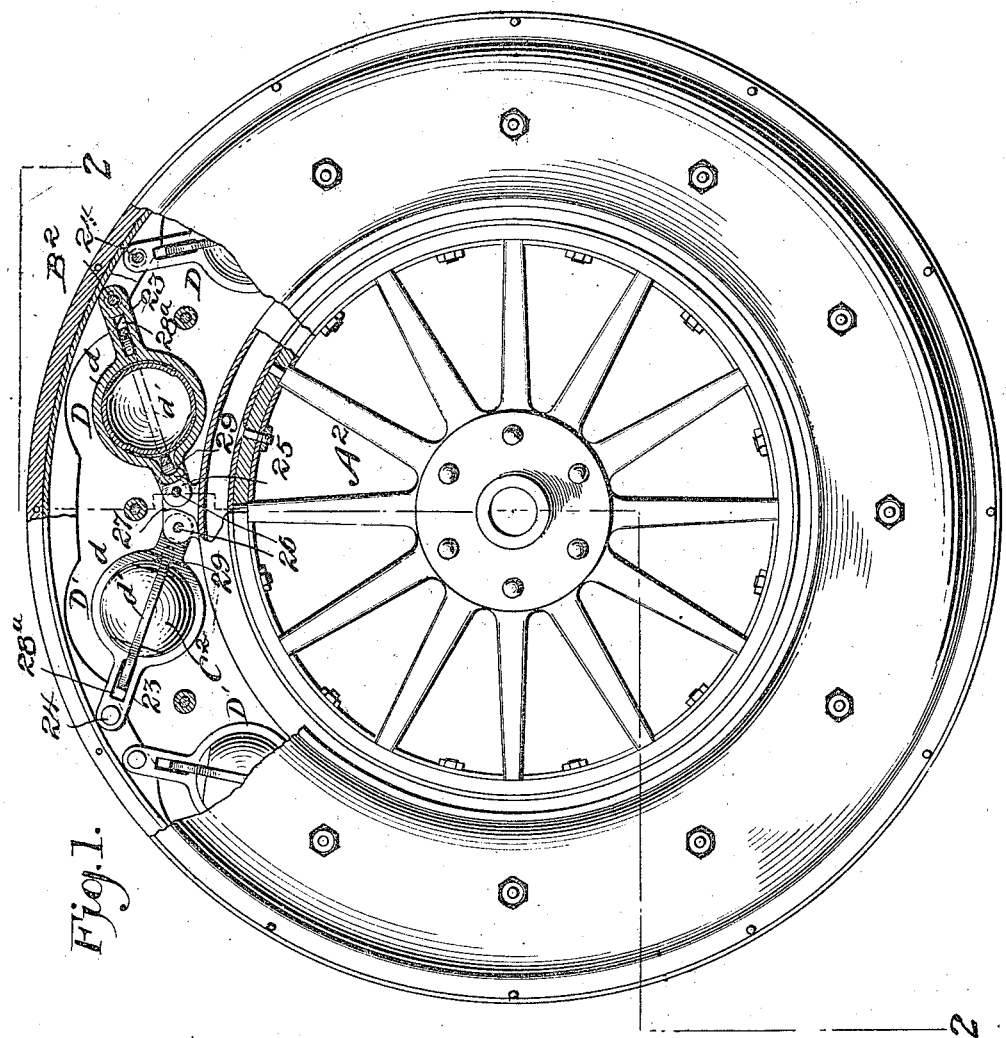
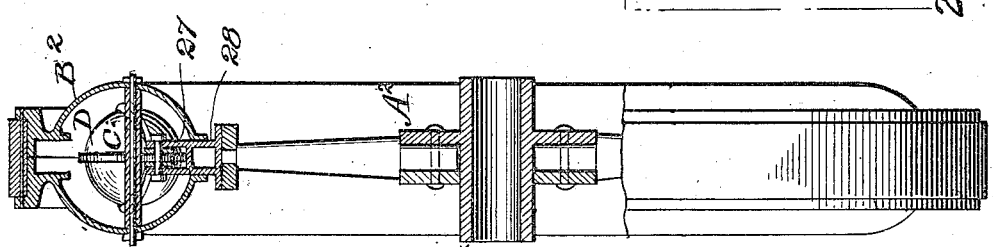
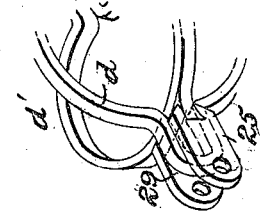
WITNESSES
INVENTOR
Benjamin J. Dryer
BY
ATTORNEYS

UNITED STATES PATENT OFFICE.

BENJAMIN JAMES DRYER, OF NEW YORK, N. Y.

RESILIENT WHEEL.

1,142,504. Specification of Letters Patent. Patented June 8, 1915.

Application filed February 11, 1914. Serial No. 818,036.

*To all whom it may concern:*

Be it known that I, BENJAMIN J. DRYER, a citizen of the United States, and a resident of the city of New York, borough of Manhattan, in the county and State of New York, have invented a new and Improved Resilient Wheel, of which the following is a full, clear, and exact description.

This invention relates to resilient wheels of the type having non-deformable treads, and the resiliency is obtained by means of pneumatic balls positioned between the inner section of the wheel and the outer tread section so as to absorb the shocks and take up the thrust imparted to the tread section.

The invention has for its general objects to improve and simplify the construction of wheels of the character referred to so as to be reliable and efficient in use, comparatively inexpensive to manufacture and keep in operative condition, and so designed as to provide the required degree of resiliency.

More specifically, the object of the invention is to provide a novel arrangement of pneumatic balls or equivalent devices which are operatively connected with the inner and outer sections of the wheel so that the inner sections will be pneumatically supported and cushioned at all points around its periphery, whereby easy running of the vehicle equipped with such wheels is rendered possible.

With such objects in view, and others which will appear as the description proceeds, the invention comprises various novel features of construction and arrangement of parts which will be set forth with particularity in the following description and claims appended hereto.

In the accompanying drawings, which illustrate one embodiment of the invention, and wherein similar characters of reference indicate corresponding parts in all the views, Figure 1 is a side view of a wheel with portions broken away and in section, wherein the pneumatic balls are yoked respectively to the inner and outer sections of the wheel; Fig. 2 is a sectional view on the line 2—2, Fig. 1; and Fig. 3 is a detail view showing the relation of the yokes for each ball.

Referring to the drawing, the pneumatic balls $C^2$ are yoked to the inner and outer sections $A^2$ and $B^2$ of the wheel by a type of truss arrangement, whereby thrusts and strains applied in any direction will be effectively cushioned. Between the two sections of the wheel are arranged pairs of linking devices D and D', each of which includes a pneumatic ball $C^2$, and these links are arranged with their longitudinal lines approximately tangential to the felly of the inner section. The linking device D is oppositely disposed to its companion linking device D'. Each device consists of two circular yokes $d$ and $d'$ which are disposed in planes ninety degrees apart, and the yoke $d$ is provided with a stem 23 which is connected by a pivot 24 with the tread or outer section $B^2$, and the other yoke $d'$ is provided with a short stem 25 which is connected by a pivot 26 with a lug 27 fastened to the rim 28 of the inner section $A^2$. The stem 23 has a slot $28^a$ through which the yoke $d'$ slides, and the stem 25 of the yoke $d'$ has a slot 29 in which the yoke $d$ slides. Arranged within the yokes $d$ and $d'$ is a pneumatic ball $C^2$. It will be obvious that with this arrangement the pneumatic balls are placed under compression when any force is applied to the wheel sections tending to throw them to an eccentric position, because in so doing the yokes $d$ and $d'$ of all the linking elements relatively shift and in contacting the pneumatic balls are compressed and thereby resist and cushion the shock imparted to the wheel and tending to change the relation of the sections thereof.

From the foregoing description taken in connection with the accompanying drawings, the advantages of the construction and method of operation will be readily understood by those skilled in the art to which the invention appertains, and while I have described the principle of operation, together with the structure which I now consider to be the best embodiment thereof, I desire to have it understood that the structure shown is merely illustrative, and that such changes may be made when desired as are within the scope of the appended claims.

Having thus described my invention, I claim as new and desire to secure by Letters Patent:

1. A wheel comprising an inner section, an outer non-deformable tread section, and cushioning means distributed around and connected with the sections for permitting relative eccentric movement in different directions, each device comprising a pair of yokes disposed in planes at an angle to each other and forming a cage, one yoke being connected with one section of the wheel and the other yoke with the other section, and a cushioning element occupying and disposed within the cage formed by the yoke, said yokes being slidably connected, whereby the cushioning element is compressed by every relative movement of the yokes.

2. A wheel comprising an inner section and an outer non-deformable tread section, a plurality of cushioning devices distributed around and located between the sections, each device comprising two slidably connected yokes arranged at right-angles to each other to form a cage, one yoke being pivotally connected with one section of the wheel and the other yoke pivotally connected with the other section, and a pneumatic ball disposed within the cage formed by the yokes and compressible by every relative movement of the yokes.

In testimony whereof I have signed my name to this specification in the presence of two subscribing witnesses.

BENJAMIN JAMES DRYER.

Witnesses:
CHATTON BRODWAY,
PHILIP D. ROLLHAUS.